Dec. 10, 1963   R. HUMPHREY   3,113,468
SPEED CHANGE GEAR MECHANISM
Filed May 22, 1961   3 Sheets-Sheet 1

INVENTOR.
Robert Humphrey
BY
ATTORNEY

Dec. 10, 1963  R. HUMPHREY  3,113,468
SPEED CHANGE GEAR MECHANISM
Filed May 22, 1961  3 Sheets-Sheet 2

INVENTOR.
Robert Humphrey
BY
ATTORNEY

Dec. 10, 1963  R. HUMPHREY  3,113,468
SPEED CHANGE GEAR MECHANISM
Filed May 22, 1961  3 Sheets-Sheet 3

INVENTOR.
Robert Humphrey
BY
ATTORNEY

United States Patent Office 3,113,468
Patented Dec. 10, 1963

3,113,468
SPEED CHANGE GEAR MECHANISM
Robert Humphrey, Pelham, N.Y.
(20—02 Utopia Parkway, Whitestone 57, N.Y.)
Filed May 22, 1961, Ser. No. 111,553
7 Claims. (Cl. 74—353)

This invention relates to speed change gear mechanisms, and more particularly, concerns mechanisms for providing a wide variety of speed ratios between the input and output thereof, in a selected direction.

An object of this invention is to provide a direct gearing type of speed changer, in improved compact form, with improved speed selector means disposed externally of the mechanism.

Another object of this invention is to provide a device of the character described, in which selection of a desired ratio between the input and output shafts is obtained by rotation of a simple selector element carrying a single selector gear, thereby minimizing the gearing and simplifying the construction of the mechanism as a whole.

A further object of this invention is to provide in a device of the character described, improved gear means disposed between a gear train providing a series of desired gear ratios, and the selector means whereby to minimize the bulk of the mechanism.

Another object of this invention is to provide a change speed gear mechanism with the ratio selector means disposed to leave the input and output sides of the mechanism clear for flush mounting on devices to be interconnected; and further to facilitate tandem interconnection of such mechanisms to increase the total number of speed ratios available.

Yet another object of this invention is to provide an improved speed change gear mechanism, the input and output shafts, as well as the intervening gear arrangement being such as to obtain a large number of different speed ratios, each speed ratio being available in a selected direction; yet leaving the mechanism in compact form.

Other objects of this invention will in part be obvious and in part hereinafter pointed out.

In the drawings, FIG. 1 is a front elevational view of a speed change gear mechanism embodying the invention;

Figure 2:
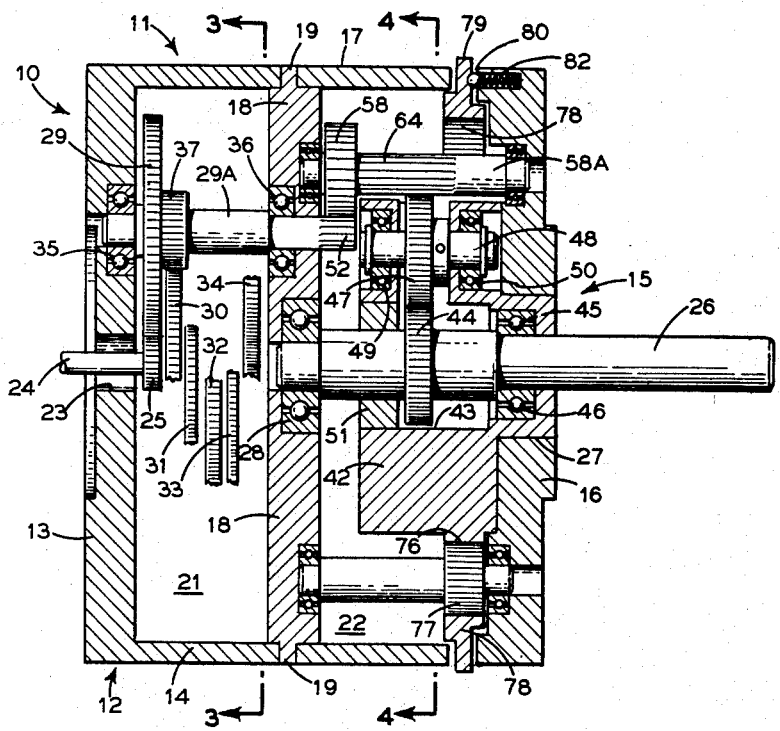
FIG. 2 is a longitudinal sectional view of the device, taken on line 2—2 of FIG. 1.
Figure 1:
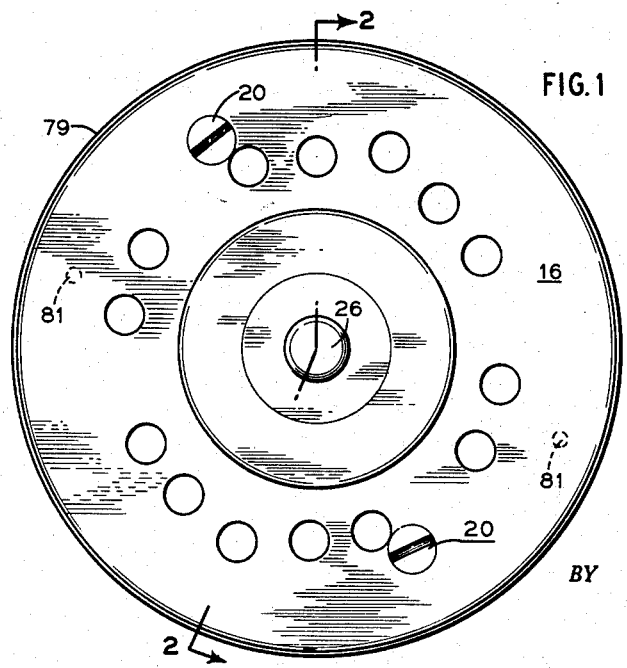

The change speed gear mechanism of the instant invention is generally designated at 10. The same comprises a cylindrical casing 11 including a back housing portion 12 with a back wall 13 and a cylindrical wall portion 14 extending forwardly thereof; a front housing portion 15 with a front wall 16 and a cylindrical wall portion 17 extending rearwardly thereof; and an intermediate support plate 18 with a radial flange portion 19 to receive and seat the edges of wall portions 14, 17. The housing portions 12, 15 and plate 18 are held together by screws 20, and thus providing a gear train compartment 21 and a selector compartment 22.

A central opening 23 in back wall 13 passes an input shaft 24 carrying a driving pinion gear 25, locating the same within compartment 21. An output shaft 26 extends through a central opening 27 in front wall 16 into compartment 22 and is supported at its inner end on plate 18 by a bearing 28 mounted thereon.

Pinion gear 25 drives a gear train within compartment 21 and comprising gears 29, 30, 31, 32, 33 and 34 disposed in side by side relation with their respective axes on a circle. Gears 29–34 are fast on their respective shafts 29A–34A which are supported on their rear portions by bearings 35 mounted on back wall 13. The forwardly extending portions of shafts 29A–34A are of reduced diameter and supported in bearings 36 mounted in plate 18.

Pinion gears 37, 38, 39, 40, 41, respectively fast to shafts 29A–33A, mesh with gears 30, 31, 32, 33 and 34 respectively, thus driving the same at different speed ratios respectively in respect to the speed of input shaft 24.

Means is provided within compartment 22 for selectively connecting output shaft 26 to shafts 29A–34A. To this end a circular cradle 42 is rotatably mounted in compartment 22 in concentric relation to shaft 26. Cradle 42 is formed with an axial bore 43 for passing shaft 26 and an output gear 44 fixed thereon. A forwardly projecting portion 45 of cradle 42, of reduced diameter, is journalled in opening 27 in front wall 16. A bearing 46 fitted in cradle portion 45 supports the forwardly projecting portion of shaft 26.

Cradle 42 is split radially inward on a peripheral portion thereof to receive therein an idler gear 47 mounted on a stub shaft 48 carried by bearings 49, 50 pressed into openings in said cradle for receiving the same. A collar 51 is press fitted on shaft 26 to support the rear portion of cradle 42. Gear 47 is in mesh with output gear 44 at all times.

Each of the shafts 29A–34A includes a forward end portion formed as an extension pinion gear 52, 53, 54, 55, 56 and 57 which projects into compartment 22. Each of said extension pinion gears 52–57 meshes respectively with pinion gears 58, 59, 60, 61, 62 and 63 on shafts 58A, 59A, 60A, 61A, 62A and 63A supported at their opposite ends by bearings mounted in walls 16 and 18. Each of the shafts 58A–63A is formed as an extension pinion gear 64, 65, 66, 67, 68 and 69 respectively for meshing relation with idler gear 47. Each of the pinion gears 58–63 meshes with a companion pinion gear 70, 71, 72, 73, 74 and 75 respectively, which in turn have extending therefrom extension pinion gears 64A–69A respectively, also adapted to mesh with idler gear 47.

It will be apparent, that upon rotating cradle 42, idler gear 47 thereon may be meshed with anyone of the extension pinion gears 64–69 respectively, to drive output shaft 26 at a selected speed ratio in respect to input shaft 24, in one direction; and in the opposite direction upon meshing idler gear 47 with extension pinion gears 64A–69A, respectively.

Means is provided for rotating cradle 42 to selected angular positions. To this end, the circumference of the cradle is formed with gear teeth 76 which mesh with a set of liaison gears 77 mounted on shafts extending between wall 16 and plate 18. In turn, gears 77 mesh with an internally toothed ring gear 78 which has an outer, knurled circumferential portion 79 which projects radially outward of the annular space 80 between wall portion 17 and wall 16.

Wall 17 is force fitted on the annular shoulder of plate 18 at flange 19 and spacer posts 81 having reduced opposite ends fitted into openings, not shown, in plate 18 and wall 16, keep wall 16 in precisely spaced relation to plate 18. Detent 82 holds ring gear 78 in selected angular positions upon manual rotation of the same through knurled portion 79 thereof.

Thus, cradle 42 is rotated to bring idler gear 47 into meshing relation with a selected extension pinion gear in groups 64–69 or 64A–69A, to provide output shaft 26 with a desired speed at indicated ratios to that of input shaft 24. This leaves casing walls 13, 16 clear for flush mounting on motors, etc. by mounting screws, not shown, and also allowing for tandem interconnection of several devices 10, to increase the total number of possible speed ratios attainable.

Figure 5:
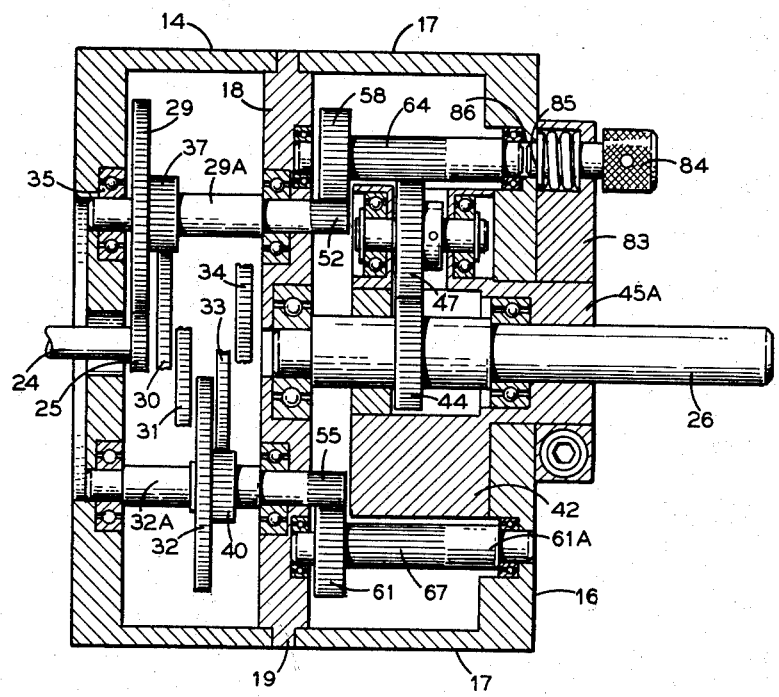
FIG. 5 is a view similar to that of FIG. 2, showing an alternative form of actuator for the gear selector means.
Figure 3:
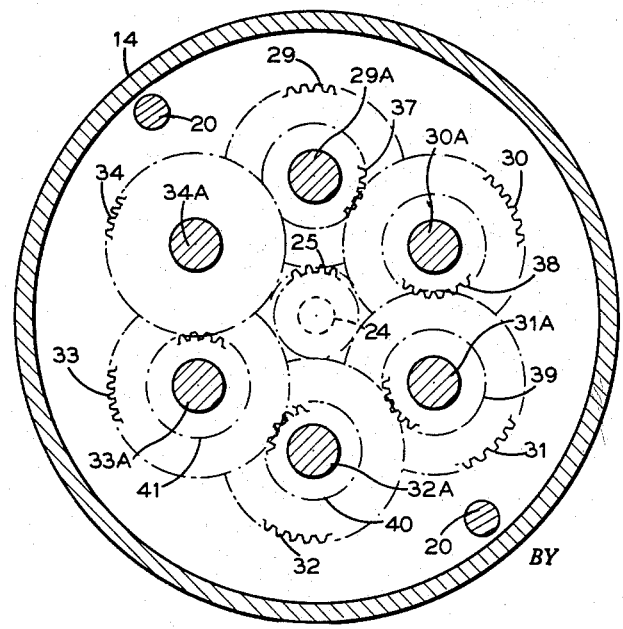
FIG. 3 is a transverse sectional view taken on the line 3—3 of FIG. 2, showing the gear train portion of the device.
Figure 4:
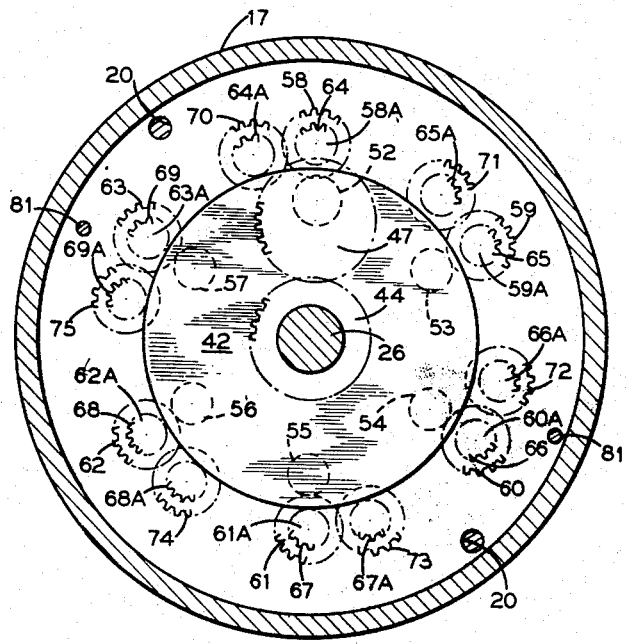
FIG. 4 is a transverse sectional view taken on the line 4—4 of FIG. 2, showing the gear selector portion thereof.
Figure 6:
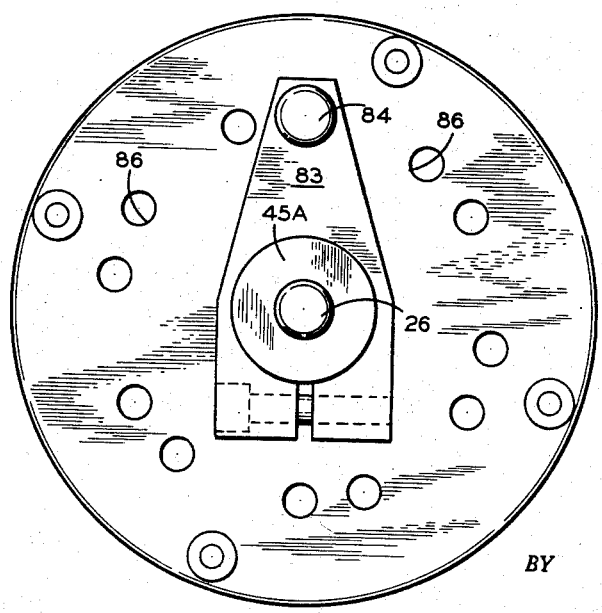
FIG. 6 is a front elevational view thereof.

Alternatively, cradle 42 may be rotated to a selected angular position, as shown in FIGS. 5, 6. Thus, cradle hub portion 45A extends beyond front wall 16 to receive thereon a crank 83 having a handle 84 projecting from the end thereof, said handle being arranged as a spring pressed detent with end portion 85 receivable in depressions 86 in wall 16, located to bring idler gear 47 into meshing relationship with the selected pinion gear in groups 64–69 or 64A–69A, as previously described.

As various changes might be made in the embodiments of the invention herein shown without departing from the spirit thereof, it is understood that all matter herein shown or described shall be deemed illustrative and not by way of limitation except as set forth in the appended claims.

What is claimed is:

1. In a speed change gear mechanism, a gear casing, input and output shafts on said casing, an input gear fast to said input shaft and an output gear fast to said output shaft, a plurality of driven shafts disposed about said input shaft, gears on each of said driven shaft and arranged relative to each other to form a gear train for driving said driven shafts at different speeds relative to each other, said input gear meshing with a gear on one of said driven shafts, each of said driven shafts including an extension pinion gear, a cradle rotatably mounted within said casing and about said output shaft, an idler gear rotatably mounted on said cradle and in mesh with said output gear, and means on said casing for rotating said cradle to selected positions to selectively mesh said idler gear with one of said extension pinion gears.

2. In a speed change gear mechanism, a gear casing, coaxially related input and output shafts on said casing, an input gear fast to said input shaft and an output gear fast to said output shaft, a cradle within said casing and rotatable about said output shaft, an idler gear rotatably mounted on said cradle and in mesh with said output gear, a plurality of driven shafts arranged about said input shaft, gear means on each driven shaft and in meshing relation to form a train of gears for driving said driven shafts at different speeds relative to each other, said input gear meshing with the gear means on one of said driven shafts, each gear of said train of gears having an extension pinion gear fast thereto, a plurality of extension pinion gears mounted on said casing about said cradle for selectively meshing with said idler gear, a pinion gear on each of said plurality of extension pinion gears and respectively in mesh with one of said first mentioned extension pinion gears, and means on said casing for rotating said cradle to selectively mesh said idler gear with one of said plurality of extension pinion gears.

3. In a speed change mechanism, a gear casing having front, rear and intermediate walls providing adjacent gear train and gear selector compartments, an input shaft projecting into said gear train compartment, an output shaft mounted on said front and intermediate walls, an output gear fast to said output shaft, a train of gears within said gear train compartment and driven from said input shaft at respective speeds different relative to each other, an extension pinion gear fast to each gear in said train of gears and projecting into said gear selector compartment, a cradle rotatably mounted within said gear selector compartment about said output gear, an idler gear mounted on said cradle and in mesh with said output gear in all positions of said cradle, a plurality of extension pinion gears mounted between the front and intermediate walls and respectively driven by said first mentioned extension pinion gears, and means on said casing for rotating said cradle to selectively mesh said idler gear with one of said second mentioned extension pinion gears.

4. In a mechanism as in claim 3 wherein said last mentioned means comprises a ring gear rotatably mounted on said casing, gear teeth on said cradle and gear means meshing with said ring gear and the gear teeth on said cradle.

5. In a mechanism as in claim 3 wherein said last mentioned means comprises an axial extension of said cradle projecting through said front casing wall and handle means fixed to said cradle extension.

6. In a speed change mechanism, a gear casing, input and output shafts on said casing, an output gear fast to said output shaft, a train of gears driven from said input shaft at respective speeds different relative to each other, an extension pinion gear fast to each gear in said train of gears, a cradle rotatable about said output shaft, an idler gear on said cradle and in mesh with said output gear in all positions of said cradle, a plurality of pairs of meshing pinion gears, one gear in each pair of meshing pinion gears being driven by one of said extension pinion gears respectively, an extension pinion gear fast to each gear in each pair of meshing pinion gears, and means for rotating said cradle to selected positions to mesh said idler gear with selected gears in each of said pairs of last mentioned extension pinion gears, whereby to obtain varied ratios of drive of said output shaft in a selected direction.

7. In a mechanism as in claim 6 wherein said cradle rotating means comprises an internal ring gear having a portion projecting from said casing for rotating said ring gear, gear teeth on said cradle and gear means within said casing meshing with said ring gear and said cradle teeth.

References Cited in the file of this patent
UNITED STATES PATENTS
922,880     Garvin et al. _____ May 25, 1909
FOREIGN PATENTS
596,708     Great Britain _____ Jan. 9, 1948